Aug. 5, 1924. 1,503,990
L. MILLBERG ET AL
COMBINED BUMPER AND FENDER BRACE AND LUGGAGE CARRIER
Filed April 2, 1923
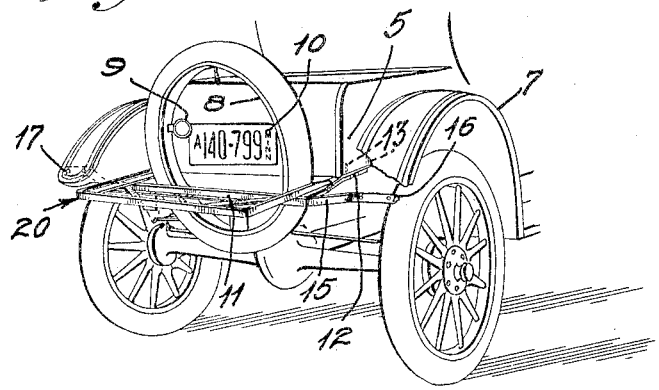
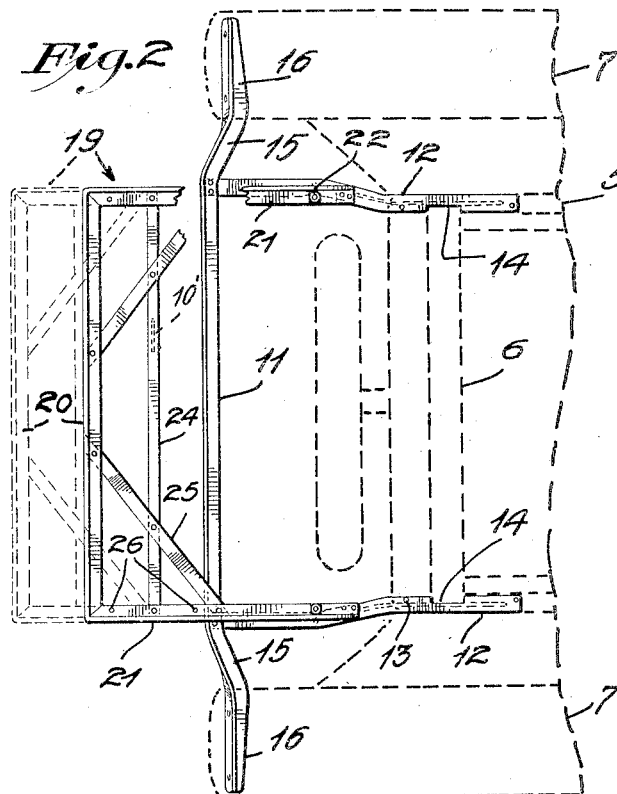
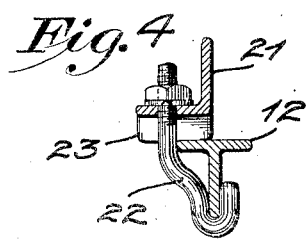
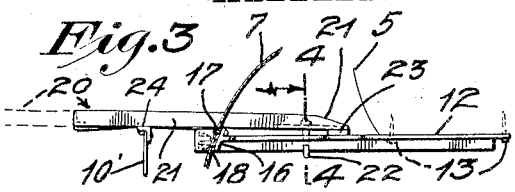

Patented Aug. 5, 1924.

1,503,990

UNITED STATES PATENT OFFICE.

LEWIS MILLBERG AND VICTOR MILLBERG, OF DASSEL, MINNESOTA.

COMBINED BUMPER AND FENDER BRACE AND LUGGAGE CARRIER.

Application filed April 2, 1923. Serial No. 629,310.

*To all whom it may concern:*

Be it known that we, LEWIS MILLBERG and VICTOR MILLBERG, citizens of the United States, residing at Dassel, in the county of Meeker and State of Minnesota, have invented certain new and useful Improvements in Combined Bumper and Fender Braces and Luggage Carriers; and we do hereby declare the following to be a full, clear, and exact description of the invention, such as will enable others skilled in the art to which it appertains to make and use the same.

Our invention relates to automobiles and has for its object to provide therefor an extremely simple, strong, durable and efficient combined bumper and fender brace, and a luggage carrier.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary perspective view showing the rear portion of a Ford automobile to which the invention is applied;

Fig. 2 is a plan view of the invention with some parts broken away and other parts shown in different positions, by means of broken lines, and also diametrically showing, by means of broken lines, parts of the automobile;

Fig. 3 is a view in side elevation showing the device removed from the automobile; and Fig. 4 is a detail view with some parts sectioned on the line 4—4 of Fig. 3, on an enlarged scale.

Of the parts of the Ford automobile illustrated, it is only necessary to note the body 5 having a rear cross tie member 6, rear fenders 7, spare tire carrier 8, rear lamp 9, and rear license plate 10.

The combined bumper and fender brace is formed from a single T-bar, the main flange of which extends horizontally forward. The intermediate portion of this T-bar is straight and affords a bumper body 11 which is rigidly secured to the body 5 by a pair of forwardly extended arms 12, each of which is formed from a single T-bar, the main flange of which extends vertically downward. At their rear ends, the arms 12 are riveted or otherwise rigidly secured to the main flange of the combined rear bumper and fender brace, and the forward end portions thereof extend under the body 5 and are rigidly secured thereto by lag screws 13 or other fastening devices.

It is important to note that the arms 12 are of such length as to support the bumper body 11 rearward of the rear ends of the rear fender 7 to protect the same.

Formed in the opposing edges of the arms 12 are notches 14 into which the ends of the cross tie members 6 extend and thereby securely interlock the arms 12 with said members and hold the same against endwise movement. This interlocking of the arms 12 with a rigid part of the body 5, towit, the cross tie bar 6, is highly important as it securely holds the combined bumper and fender brace so as to resist severe impacts; and it also prevents the sheering of the lag screws or other fastening devices 13 under such impacts.

The end portions of the combined bumper and fender brace, outward of the arms 12, are obliquely and forwardly offset at 15 and then twisted in a vertical plane and extend parallel to the inner faces of the rear fender 7, as at 16, to closely fit against said fenders near their lower ends and are rigidly secured thereto by rivets 17 or other fastening devices. Pieces of fibre or other suitable material 18 are interposed between the rear fenders 7 and members 16 to prevent squeaks and rattling.

Obviously, the combined bumper and fender brace rigidly interconnects the rear fenders 7 and arms 12 and rigidly holds the same properly spaced against lateral vibrations or impacts against the combined bumper and fender brace. Said rear fenders 7 are also securely held against longitudinal vibration and will not bend in case the vehicle is backed into or struck by another vehicle or object.

The spare tire carrier 8, lamp 9, and license plate 10 are within the arms 12 and forward of the bumper proper, and are thereby securely protected from being bent or otherwise damaged.

Referring now to the trunk or luggage carrier 19, the same, as shown, is of U-shaped formation and formed from a single angle bar, the horizontal flange of which is turned inward to afford a trunk or other support 20, and the vertical flange of which is turned upward to afford a trunk-retaining flange 21. The arms of the carrier extend horizontally and transversely over the combined bumper and fender brace and intermediately rest thereon, and they also extend longitudinally over the arms 12. At their forward ends, the arms of the carrier 19 are detachably and adjustably secured to the arms 12 by nut-equipped bolts 22. These bolts 22 extend through bores in the supporting flange 20 and have hook-like heads that are interlocked with the depending main flange of the arms 12 with freedom for longitudinal sliding movement thereon, as best shown in Fig. 4.

By reference to Figs. 2 and 4 it will be noted that the bodies of the bolts 22 closely engage the inner edges of the arms 12 and hold the arms of the carrier 19 properly spaced and against outward spreading movement. The hook-like heads on the bolts 22 also hold the arms of the carrier 19 against lateral movements toward each other. Spacing blocks 23 are secured to the rear ends of the arms of the carrier 19 forward of the bolts 22, rest on the arms 12 and support the arms of the carrier 19, as best shown in Fig. 2. Obviously, by loosening the nuts on the bolts 22, said bolts may be turned into interlocking engagement with the main flanges of the arms 12 or released therefrom by a turning movement of said bolts.

The arms of the carrier 19, near their rear end portions, are rigidly connected by an angle cross tie bar 24 riveted to the under face of the supporting flange 20. Said arms of the carrier 19 are further rigidly held by oblique corner brace bars 25 which are riveted at their ends to the under face of the supporting flange 20, and at their intermediate portions they are extended over the cross tie bar 24 and are riveted thereto. These bars 24 and 25 greatly strengthen the carrier 19 and afford a very rigid structure, and, as they are secured to the under face of the supporting flange 20, they do not in any way interfere with a trunk or other receptacle mounted on the flange 20 within the retaining flange 21. By loosening the nuts on the bolts 22, the carrier 19 may be adjusted toward and from the vehicle, as indicated by broken lines in Fig. 2. Formed in the supporting flange 21, are bores 26 through which screws, bolts or other fastening devices may be inserted for securing a trunk or other receptacle to the carrier 19, and when removing the same from the combined bumper and fender brace, the carrier 19 may be removed therewith simply by releasing the two bolts 22 from the arms 12. By placing the bolts 22 between the combined bumper and fender brace and the spacing block 23, said bolts will securely hold the carrier 19 against vertical movement in respect to the members on which it is supported.

Said carrier 19 is also securely held by the bolts 22 against lateral shifting movements of the combined bumper and fender brace and arms 12. In case a trunk or other receptacle, mounted on the carrier 19 is of such height as to interfere with the lamp 9 or license plate 10, either or both of said members may be attached to the cross tie bar 24, as the license plate 10' is shown in Fig. 3.

A trunk or other receptacle on the carrier 19 does not in any way interfere with the spare tire carrier 8, and there is sufficient room to apply or remove a tire from its carrier.

The above described invention has, in actual commercial use, proven highly efficient for the purpose had in view, and as all the parts thereof are manufactured from commercial bars, the same can be manufactured at a comparatively small cost, and the work of applying the same to a vehicle is simple and requires very little time.

This invention is a continuation of or substitute for our application entitled "Improvement in auto brace and bumper for automobiles," filed Dec. 30, 1921, under Serial Number 526,050.

What we claim is:

1. The combination with a vehicle having a body and rear fenders, of a pair of arms rigidly secured to the vehicle body and projecting rearwardly therefrom, a bumper bar secured to the rear ends of said arms and having ends projecting outward of said arms and attached to said rear fenders, and a luggage carrier supported in part from said bumper bar and in part from said arms and projecting rearward of said bumper bar.

2. The structure defined in claim 1 in which said luggage carrier has clamping devices making the same slidably adjustable and adapted to rigidly secure the same in different adjustments.

3. The combination with a vehicle bumper and a pair of flanged arms for attaching the same to a vehicle, of a luggage carrier supported on the bumper, and hook-like bolts having sliding interlocking engagement with the flanged arms for holding the luggage carrier on the bumper.

4. The combination with a vehicle bumper and a pair of flanged arms for attaching the same to a vehicle, of a luggage carrier supported on the bumper, hook-like bolts having sliding interlocking engagement with the flanged arms for holding the luggage carrier on the bumper, and stops for limiting the sliding movement of the bolts on the flanged arms.

5. The combination with a vehicle bumper and a pair of flanged arms for attaching the same to a vehicle, of a luggage carrier having a pair of arms extending transversely over the bumper and intermediately supported thereon, the inner ends of the arms of the carrier being supported on the flanged arms, and hook-like bolts attached to the arms of the carrier between their inner ends and the bumper and having sliding interlocking engagement with the flanges of the first noted arms for adjustably holding the luggage carrier on the bumper.

In testimony whereof we affix our signatures.

LEWIS MILLBERG.
VICTOR MILLBERG.